United States Patent
Klotz et al.

(10) Patent No.: US 7,156,239 B2
(45) Date of Patent: Jan. 2, 2007

(54) FILTER UNIT FOR FREEZABLE LIQUIDS, PARTICULARLY FOR A METERING UNIT OF AN EXHAUST GAS TREATMENT DEVICE

(75) Inventors: Stefan Klotz, Aichtal (DE); Dieter Maisch, Kohlberg (DE)

(73) Assignee: Hydraulik-Ring GmbH, Nürtingen (DE)

( * ) Notice: Subject to any disclaimer, the term of this patent is extended or adjusted under 35 U.S.C. 154(b) by 19 days.

(21) Appl. No.: 10/249,807

(22) Filed: May 9, 2003

(65) Prior Publication Data

US 2003/0209482 A1    Nov. 13, 2003

(30) Foreign Application Priority Data

May 10, 2002  (DE) ................. 102 20 672

(51) Int. Cl.
*B01D 35/31*  (2006.01)
*B01D 27/08*  (2006.01)

(52) U.S. Cl. .................. 210/435; 210/446; 73/277; 138/28

(58) Field of Classification Search ........... 210/446, 210/447, 451, 453, 497.01, 349, 435; 138/28; 73/277
See application file for complete search history.

(56) References Cited

U.S. PATENT DOCUMENTS

| | | | | |
|---|---|---|---|---|
| 1,059,370 A | * | 4/1913 | Johnson | 138/28 |
| 1,971,026 A | * | 8/1934 | Beall | 138/27 |
| 3,125,063 A | * | 3/1964 | Hultgren | 116/268 |
| 3,492,868 A | * | 2/1970 | Pontis | 73/260 |
| 3,894,432 A | * | 7/1975 | Coughlin | 73/201 |
| 4,146,485 A | | 3/1979 | Broad | 210/416 |
| 4,529,512 A | * | 7/1985 | Williamson et al. | 210/120 |
| 4,595,037 A | * | 6/1986 | LeBreton et al. | 138/30 |
| 4,693,202 A | * | 9/1987 | Helpio | 114/74 A |
| 4,836,923 A | * | 6/1989 | Popoff et al. | 210/232 |
| 4,839,048 A | | 6/1989 | Reed et al. | 210/450 |
| 4,842,737 A | | 6/1989 | Reed | 210/321.87 |
| 5,399,264 A | * | 3/1995 | Pulek et al. | 210/450 |
| 5,468,388 A | | 11/1995 | Goddard et al. | 210/321.75 |
| 5,884,475 A | | 3/1999 | Hofmann et al. | 60/274 |
| 6,306,192 B1 | | 10/2001 | Greif et al. | 55/498 |

FOREIGN PATENT DOCUMENTS

| | | |
|---|---|---|
| DE | 2 121 533 | 11/1972 |
| DE | 38 33 134 | 4/1990 |
| DE | 195 36 613 | 11/1996 |
| JP | 61197013 A * | 9/1986 |

OTHER PUBLICATIONS (Merriam-Webster Online Dictionary © 2005-2006 Merriam-Webster, Inc.).*
English translation of DE 2,121,533.*

* cited by examiner

*Primary Examiner*—Terry K. Cecil
(74) *Attorney, Agent, or Firm*—Gudrun E. Huckett

(57) ABSTRACT

A filter unit for liquids undergoing freezing for a metering unit of an exhaust gas treatment unit has a housing having an outer member and a lid member. At least one filter insert is arranged in the housing. An elastically deformable casing part is provided that surrounds at least partially the filter insert. The elastically deformable casing part is a part of the lid member or of the outer member of the housing and is made of a thermoplastic synthetic material. When the liquid undergoes freezing and thawing in the filter unit, the elastically deformable casing part can compensate the volume changes caused by freezing and thawing.

17 Claims, 3 Drawing Sheets

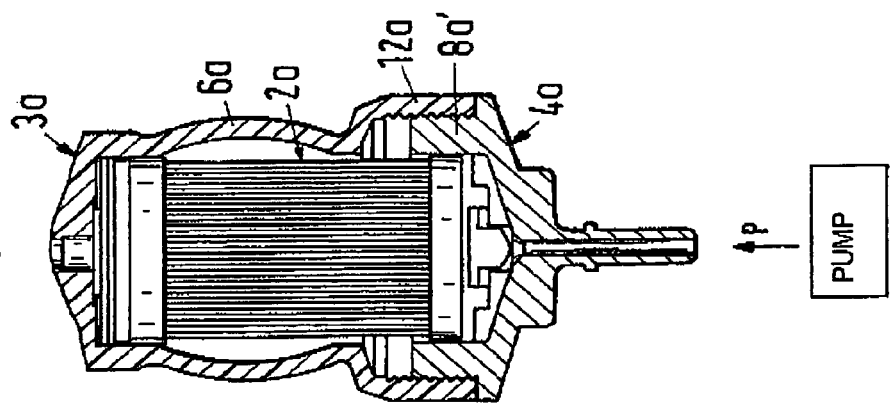
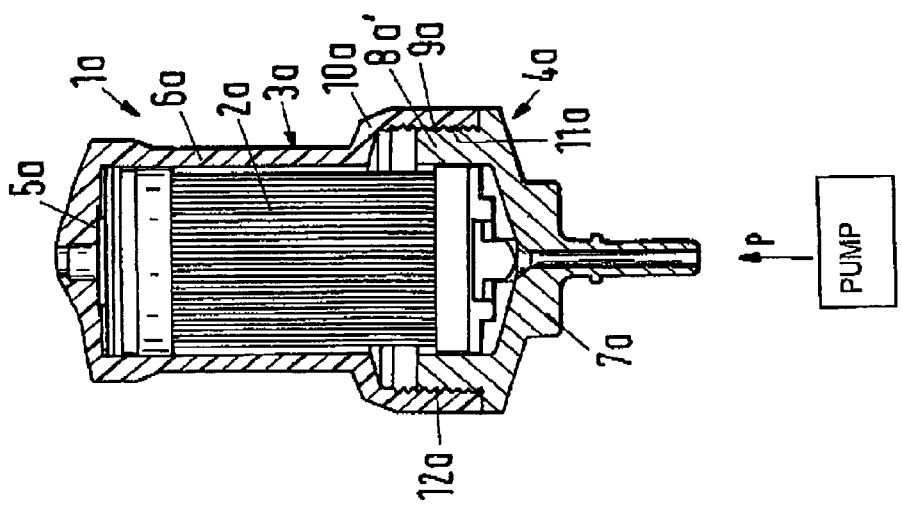

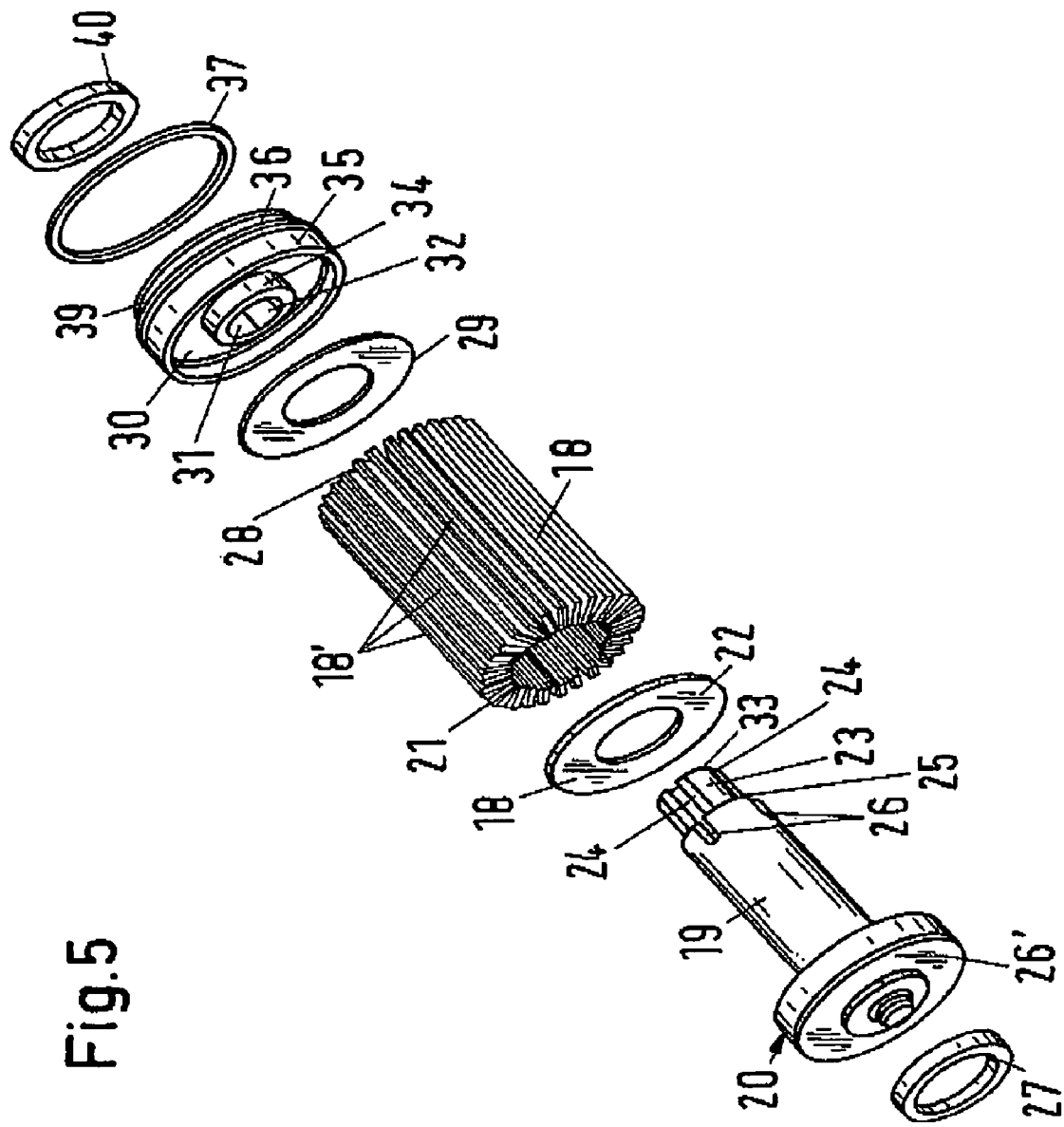

FILTER UNIT FOR FREEZABLE LIQUIDS, PARTICULARLY FOR A METERING UNIT OF AN EXHAUST GAS TREATMENT DEVICE

BACKGROUND OF INVENTION

1. Field of the Invention

The invention relates to a filter unit for liquids that can freeze, in particular, for a metering unit of an exhaust gas treatment unit, comprising at least one filter insert arranged in a housing that comprises an outer member and a lid member.

2. Description of the Related Art

In known filter units of this kind, an aqueous solution or liquid, for example, an urea solution, a saline solution, water or the like, is guided through a filter unit by means of a pump and is then supplied at a certain pressure to a metering unit, for example, of an exhaust gas treatment device. When the aqueous medium freezes, a medium-specific volume expansion occurs. This volume expansion is between approximately 6% up to approximately 10%. Since in the known filter units the outer housing member is comprised of metal, the volume expansion causes permanent damage of the housing already after a relatively short period of time.

SUMMARY OF INVENTION

It is an object of the present invention to configure a filter unit of the aforementioned kind such that the housing can receive the occurring volume changes upon conversion from the liquid to the solid state of the medium without causing damage even after an extended period of use.

In accordance with the present invention, this is achieved in that the filter insert is surrounded at least partially by an elastically deformable casing part.

As a result of the configuration according to the invention, the jacket part is elastically deformed upon pressure expansions and volume expansions of the medium occurring when the state of aggregation (physical state) of the medium changes and returns subsequently into its initial shape. In this way, damage of the housing is safely and reliably prevented even after extended periods of use.

BRIEF DESCRIPTION OF DRAWINGS

FIG. 3 shows a second embodiment of the filter unit according to the invention in an illustration corresponding to FIG. 1.

FIG. 4 shows the embodiment of FIG. 3 in the deformed state.

FIG. 5 is a perspective illustration of a filter insert of the filter unit according to the invention.

DETAILED DESCRIPTION

Figure 2:
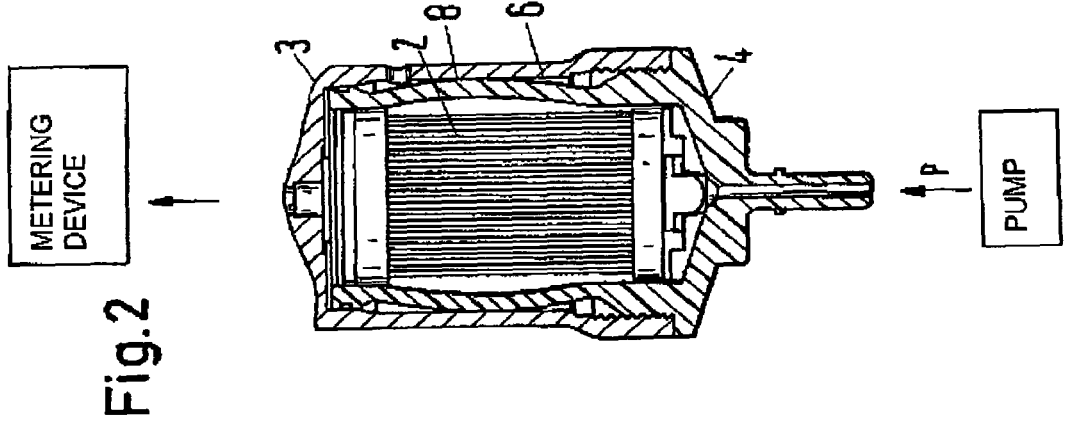
FIG. 2 shows the filter unit of FIG. 1 in the deformed state.

The filter units 1,1a illustrated in the drawings are provided between a pump only schematically shown, and a metering, only schematically shown, preferably of an exhaust gas treatment device. The pump supplies an aqueous medium, for example, a urea solution, a saline solution, water or the like, in the direction of arrow P to the filter unit that is under a defined pressure. Upon operation of the filter unit, the medium is frozen and subsequently thawed again so that a volume expansion upon conversion from the liquid to the solid state of the medium occurs. The volume expansion in the case of urea is approximately 6 to 8% and in the case of water approximately 10% and is therefore relatively large. In order to be able to take up such volume expansions properly, the filter unit has a housing with an elastically deformable casing part, as will be explained in the following.

Figure 1:
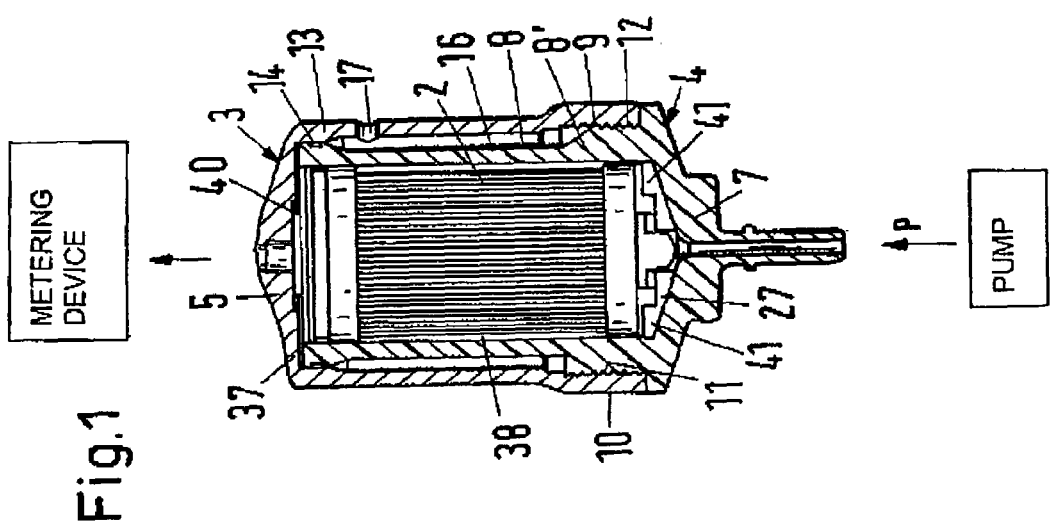
FIG. 1 is an axial section of the first embodiment of the filter unit according to the invention in its undeformed state.

The filter unit 1 according to FIGS. 1 and 2 comprise a filter insert 2 which is arranged within a housing 3, 4. The housing is comprised of an outer housing member 3 and a lid member 4. The outer member 3 is cup-shaped and has a bottom 5 and a cylindrical casing part 6. The outer member 3 is comprised of metal, preferably of aluminum.

The lid member 4 is also cup-shaped and provided with a bottom 7 and a cylindrical section or casing part 8. The bottom 7 and the casing part 8 are formed from elastically deformable material as a unitary part. Preferably, a thermoplastic synthetic material (plastic) and, in particular, a thermoplastic elastomer is used; particularly suitable is Santoprene® D 40 E Shore marketed by the company Advanced Elastomer Systems; this material has a high elasticity at low temperatures of minus 40 degrees C. as well as a fatigue resistance which is six to eight times that of conventional elastomers. The lid member 4 can be produced of such a material simply by injection molding so that no vulcanization processes are required; this is advantageous with regard to the manufacturing costs of the housing and thus of the filter unit 1.

In the transition area from the plate-shaped bottom part 7 into the casing part 8, the wall section 8' adjoining the bottom has a wall thickness which is approximately twice as thick as in the remaining area and forms a cylindrical rim. The wall section 8' has an outer peripheral surface 9 with an outer thread 12 onto which the outer casing part 6 can be screwed with its inner thread 11 provided at the free end 10.

The casing part 6 of the outer member 3 has at least one relief bore 17 provided at a spacing from the bottom 5.

The free edge 13 of the casing part 8 has a greater thickness than the remainder of the casing part. The edge 13 has a circumferential annular groove 14 in which a seal 15 configured as an O-ring is positioned. By means of the seal 15, the casing part 8 rests sealingly against the casing part 6 of the outer housing member 3. In the area between the edge 13 and the wall section 8', the casing part 8 has a constant wall thickness which, in the shown embodiment, is slightly greater than that of the outer casing part 6. Between the two casing parts 6, 8 an annular space 16 is formed.

The filter insert 2 is tightly surrounded by the casing part 8 and the bottom 5 of the outer housing member 3. When the medium freezes, the casing part 8 can be elastically deformed by the volume increase of the medium caused by freezing so that it will deflect into the free annular space 16 in the outward direction (FIG. 2). After the medium has thawed, and optionally after pressure release, the casing part 8 will return into its initial shape shown in FIG. 1. The outer casing part 6 is thus not damaged by the volume expansion. This described deformation action can be repeated frequently (as often as desired) without this having a negative effect on the casing part 6.

As shown in FIG. 5, the filter insert 2 has a sleeve-shaped paper insert 18 which is comprised of filter paper 18' folded in an accordion-shape. It is arranged on a pin-shaped filler member 19 having at one end a terminal disk 20. The end face 21 of the paper insert 18 rests against this terminal disk with interposition of an annular adhesive film 22. The filler member 19 has a narrow end 23 which is provided with axially extending slots 24 which are positioned sequentially behind one another with identical spacing in the circumferential direction. The narrow end 23 passes with a radial shoulder area 25 into the filler member 19. Slots 26 provided in the circumferential surface of the filler member 19 open into the shoulder area 25; the slots 26 extend parallel to the slots 24. They are shorter than the slots 24 so that they extend only across a relatively short portion of the filler member 19. The terminal disk 20 of the filler member 19 has at its end face 26 facing away from the end 23 an annular groove (not illustrated in detail) in which a tensioning ring 27 is positioned with which the filter insert 2 is supported on stays 41 on the bottom 7 of the lid member 4 (FIGS. 1 and 2).

When the filter insert 2 is in the mounted position, the narrow end 23 of the filler member 19 projects past the opposite end face 28 of the paper insert 18. On the narrow end 23 a second terminal disk 30 is fixedly secured with interposition of an additional annular disk-shaped adhesive film 29. The terminal disk 30 has a central opening 31 with diametrically opposed flat inner surfaces 32 on which the narrow end 23 with two oppositely positioned stays 33 rests areally; the stays 33 are formed between neighboring slots 24. The terminal disk 30 has an inner edge 34 limiting the opening 31 and an outer edge 35 which has in its peripheral surface an annular groove 36. A seal 37 in the form of an O-ring is positioned in the annular groove 36. The filter insert 2 rests by means of the seal 37 sealingly against the inner wall 38 of the casing part 8 of the lid member 4 (FIG. 1). In a groove (not illustrated) provided in the end face 39 of the terminal disk 30 a tensioning ring 40 is arranged in the same way as in the terminal disk 20; by means of the tensioning ring 40, the filter insert 2 sealingly rests against the bottom 5 of the outer member 3 (FIG. 1).

Via the filter insert 2 and the casing part 8 in the metallic housing part 3, heating by radiant heat of the outer member 3 and thus thawing of the frozen filter element is possible.

In the case that in the annular space 16 a counter pressure is to be built up, the relief bore 17 provided in the casing part 6 is not needed.

In the configuration according to FIGS. 3 and 4, the outer housing member 3a is comprised of elastically deformable material, preferably of a thermoplastic elastomer. The outer housing member 3a can therefore be injection molded. The lid member 4a is comprised of a bottom part 7a and a cylindrical part 8a' with a cylindrical rim. It has a circumferential surface 9a with an outer thread 12a. In contrast to the configuration of FIGS. 1 and 2, the lid member 4a is comprised of metal, preferably aluminum; however, it can also be manufactured of a correspondingly strong plastic material.

The outer member 3a has a bottom 5a which is formed as a unitary part together with the cylindrical section or casing part 6a. The casing part 6a surrounds the filter insert 2a at a spacing. In contrast to the outer member 3 of FIG. 1, the free edge 10a of the casing part 6a is moved relatively far outwardly and has an inner thread 11a with which the outer member 3a can be screwed onto the outer thread 12a of the casing part 8a' of the lid member 4a. When the medium flowing through the filter element 1a freezes, the casing part 6a is elastically deformed outwardly by a certain amount due to the volume enlargement caused by freezing (FIG. 4). Upon subsequent thawing, the casing part 6a returns into its original cylindrical shape (FIG. 3) without the housing member 3a being damaged.

In this configuration, the filter insert 2a is also tightly surrounded at its exterior.

This configuration, in which only the elastically deformable plastic housing member 3a with casing part 6a is provided, is constructively simple and can be manufactured inexpensively.

While specific embodiments of the invention have been shown and described in detail to illustrate the inventive principles, it will be understood that the invention may be embodied otherwise without departing from such principles.

What is claimed is:

1. A filter unit for an aqueous medium for a metering unit of an exhaust gas treatment unit, the filter unit comprising:
   a housing consisting of a first part and a second part, wherein the first part is an outer member and the second part is a lid member;
   at least one filter insert arranged in the housing;
   wherein the outer member or the lid member has an elastically deformable casing part surrounding at a spacing the at least one filter insert and covering an axial length of the at least one filter insert, wherein an annular space is delimited between the elastically deformable casing part and the at least one filter insert;
   wherein the elastically deformable casing part expands to compensate a volume increase of an aqueous medium contained in the filter unit when the aqueous medium freezes in the filter unit.

2. The filter unit according to claim 1 wherein the lid member having the elastically deformable casing part or the outer member having the elastically deformable casing part is an injection-molded part.

3. The filter unit according to claim 1 wherein the elastically deformable casing part is comprised of thermoplastic synthetic material.

4. The filter unit according to claim 3, wherein the thermoplastic synthetic material is a thermoplastic elastomer.

5. The filter unit according to claim 1, wherein the elastically deformable casing part is a part of the lid member and wherein the outer member has an outer casing part, wherein between the outer casing part and the elastically deformable casing part an annular chamber is formed.

6. The filter unit according to claim 5, wherein the elastically deformable casing part has an undeformed state and is spaced in the undeformed state from the at least one filter insert and from the outer casing part of the outer member.

7. The filter units according to claim 1, wherein the outer member and the lid member are connected to one another.

8. The filter unit according to claim 7. wherein the lid member has a widened wall section provided with an outer thread.

9. The filter unit according to claim 7, wherein the widened wall section forms a cylindrical rim of the lid member.

10. The filter unit according to claim 1, wherein the elastically deformable casing part has a free edge, wherein the free edge rests sealingly against the outer member.

11. The filter unit according to claim 1, wherein at least one of the outer member and the lid member is comprised of metal.

12. The filter unit according to claim 11, wherein the metal is aluminum.

13. An exhaust gas treatment device comprising:
    a metering device;
    a filter unit connected to the metering device;

a pump supplying an aqueous medium through the filter unit to the metering device that meters the aqueous medium into exhaust gas for treating the exhaust gas;

wherein the filter unit has a housing consisting of an outer member and a lid member;

wherein the filter unit has at least one filter insert arranged in the housing;

wherein the outer member or the lid member has an elastically deformable casing part surrounding at a spacing the at least one filter insert and covering an axial length of the at least one filter insert, wherein an annular space is delimited between the elastically deformable casing part and the at least one filter insert;

wherein the elastically deformable casing part expands to compensate a volume increase of the aqueous medium when the aqueous medium freezes in the filter unit.

14. The exhaust gas treatment device according to claim 13, wherein the elastically deformable casing part is a part of the lid member and wherein the outer member has an outer casing part, wherein between the outercasing part and the elastically deformable casing part an annular chamber is formed.

15. The exhaust gas treatment device according to claim 14, wherein the elastically deformable casing part has an undeformed state and is spaced in the undeformed state from the at least one filter insert and from the outer casing part of the outer member.

16. The exhaust gas treatment device according to claim 13, wherein the outer member and the lid member are connected to one another.

17. The exhaust gas treatment device according to claim 13, wherein the elastically deformable casing part has a free edge, wherein the free edge rests sealingly against the outer member.

* * * * *